(12) United States Patent
Liszkai

(10) Patent No.: US 12,537,111 B2
(45) Date of Patent: Jan. 27, 2026

(54) CLOSURES FOR PRESSURE VESSELS, AND ASSOCIATED SYSTEMS AND METHODS

(71) Applicant: NuScale Power, LLC, Portland, OR (US)

(72) Inventor: Tamas R. Liszkai, Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 1171 days.

(21) Appl. No.: 17/475,324

(22) Filed: Sep. 14, 2021

(65) Prior Publication Data

US 2025/0046481 A1    Feb. 6, 2025

Related U.S. Application Data

(60) Provisional application No. 63/080,553, filed on Sep. 18, 2020.

(51) Int. Cl.
*G21C 13/028*    (2006.01)

(52) U.S. Cl.
CPC .................................. *G21C 13/028* (2013.01)

(58) Field of Classification Search
CPC .................................................... G21C 13/028
USPC ........................................................ 220/378
See application file for complete search history.

(56) References Cited

U.S. PATENT DOCUMENTS

| | | | | |
|---|---|---|---|---|
| 2,347,844 A * | 5/1944 | Sandberg | ................. | F16J 15/48 |
| | | | | 292/145 |
| 3,055,529 A * | 9/1962 | Cameron | ............... | F16J 13/065 |
| | | | | 220/4.07 |
| 3,216,746 A | 11/1965 | Watts | | |
| 3,225,956 A | 12/1965 | Laming | | |
| 3,269,585 A * | 8/1966 | Christensen | ............. | F16J 13/02 |
| | | | | 220/378 |

(Continued)

FOREIGN PATENT DOCUMENTS

| | | |
|---|---|---|
| EP | 0107707 B1 | 8/1987 |
| EP | 3822520 A1 | 5/2021 |
| GB | 2558001 A | 7/2018 |

OTHER PUBLICATIONS

International Search Report and Written Opinion for International Application No. PCT/US2021/050345 issued Dec. 28, 2021. 13 pages.

(Continued)

*Primary Examiner* — Orlando E Aviles
*Assistant Examiner* — Niki M Eloshway
(74) *Attorney, Agent, or Firm* — Lee & Hayes, P.C.

(57) ABSTRACT

Pressure vessels and closures for pressure vessels, such as for use in nuclear reactor systems, are described herein. A representative pressure vessel includes (i) a first enclosure including a first flange having a lower surface and a first inner surface, and (ii) a second enclosure including a second flange having an upper surface and a second inner surface. The pressure vessel can further include a sealing member having a first portion and a second portion. The first portion is configured to contact both the lower surface of the first flange and the upper surface of the second flange to provide a first seal between the first and second enclosures. The second portion is configured to contact, via an interference fit, both the first inner surface of the first flange and the second inner surface of the second flange to provide a second seal between the first and second enclosures.

10 Claims, 11 Drawing Sheets

(56) References Cited

U.S. PATENT DOCUMENTS

| | | | | |
|---|---|---|---|---|
| 3,294,409 | A | * | 12/1966 | Burtis ................ F16J 15/0887 |
| | | | | 220/378 |
| 3,355,057 | A | * | 11/1967 | Mackenzie ........... F16J 15/061 |
| | | | | 277/626 |
| 3,813,904 | A | * | 6/1974 | Wallskog ................ C08K 7/12 |
| | | | | 220/326 |
| 4,206,499 | A | * | 6/1980 | Urbanek ................ F21S 43/51 |
| | | | | 362/546 |
| 4,353,560 | A | | 10/1982 | Tohill |
| 4,410,186 | A | | 10/1983 | Pierce, Jr. |
| 4,653,172 | A | | 3/1987 | Hackley |
| 7,624,991 | B2 | | 12/2009 | Putch |
| 2005/0008473 | A1 | * | 1/2005 | Balsdon ............... F01D 11/008 |
| | | | | 415/110 |
| 2007/0024007 | A1 | | 2/2007 | Putch |
| 2012/0294405 | A1 | | 11/2012 | Shargots |
| 2013/0292383 | A1 | * | 11/2013 | Mullaney .............. H05K 5/062 |
| | | | | 277/654 |
| 2014/0138385 | A1 | * | 5/2014 | Wolf ..................... F16J 15/025 |
| | | | | 220/378 |
| 2015/0083234 | A1 | | 3/2015 | Dinovo et al. |
| 2015/0276105 | A1 | | 10/2015 | Bander et al. |

OTHER PUBLICATIONS

Freudenberg "Large Opening and Hyperbaric Closures" retrieved online from https://www.fogt.com/large-opening-closures on Nov. 30, 2021. 4 pages.

Search Report for European Application No. 21870079.7, Dated Sep. 3, 2024, 10 pages.

\* cited by examiner

CLOSURES FOR PRESSURE VESSELS, AND ASSOCIATED SYSTEMS AND METHODS

CROSS-REFERENCE TO RELATED APPLICATION

This application claims the benefit of U.S. Provisional Patent Application No. 63/080,553, filed Sep. 18, 2020, and titled "LARGE VESSEL CLOSURE DESIGN USING CLAMP BASED TECHNOLOGY WITH REUSABLE AND TESTABLE T- OR H-RING SEALS, AND ASSOCIATED SYSTEMS AND METHODS," which is incorporated herein by reference in its entirety.

STATEMENT REGARDING FEDERALLY SPONSORED RESEARCH

This invention was made with Government support under Contract No. DE-NE0008928 awarded by the Department of Energy. The Government has certain rights in this invention.

TECHNICAL FIELD

The present technology is related to devices, systems, and methods for closing and sealing pressure vessels, such as a reactor pressure vessel of a nuclear reactor power conversion system.

BACKGROUND

Power conversion systems often include one or more large pressure vessels. For example, some nuclear reactor power conversion systems include a reactor pressure vessel that houses a reactor core and coolant for transferring heat from the reactor core. The reactor pressure vessel can include multiple pieces that can be detached from one another to allow access to the reactor core for maintenance, refueling, and the like. During operation, the pieces must be securely attached and sealed together. Typically, O-rings or gaskets are used to seal the interface between the pieces. However, such O-rings or gaskets can plastically deform during operation such that they must be replaced each time the reactor pressure vessel is opened, increasing the cost of operating the nuclear reactor power conversion system.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

DETAILED DESCRIPTION

Figure 1:
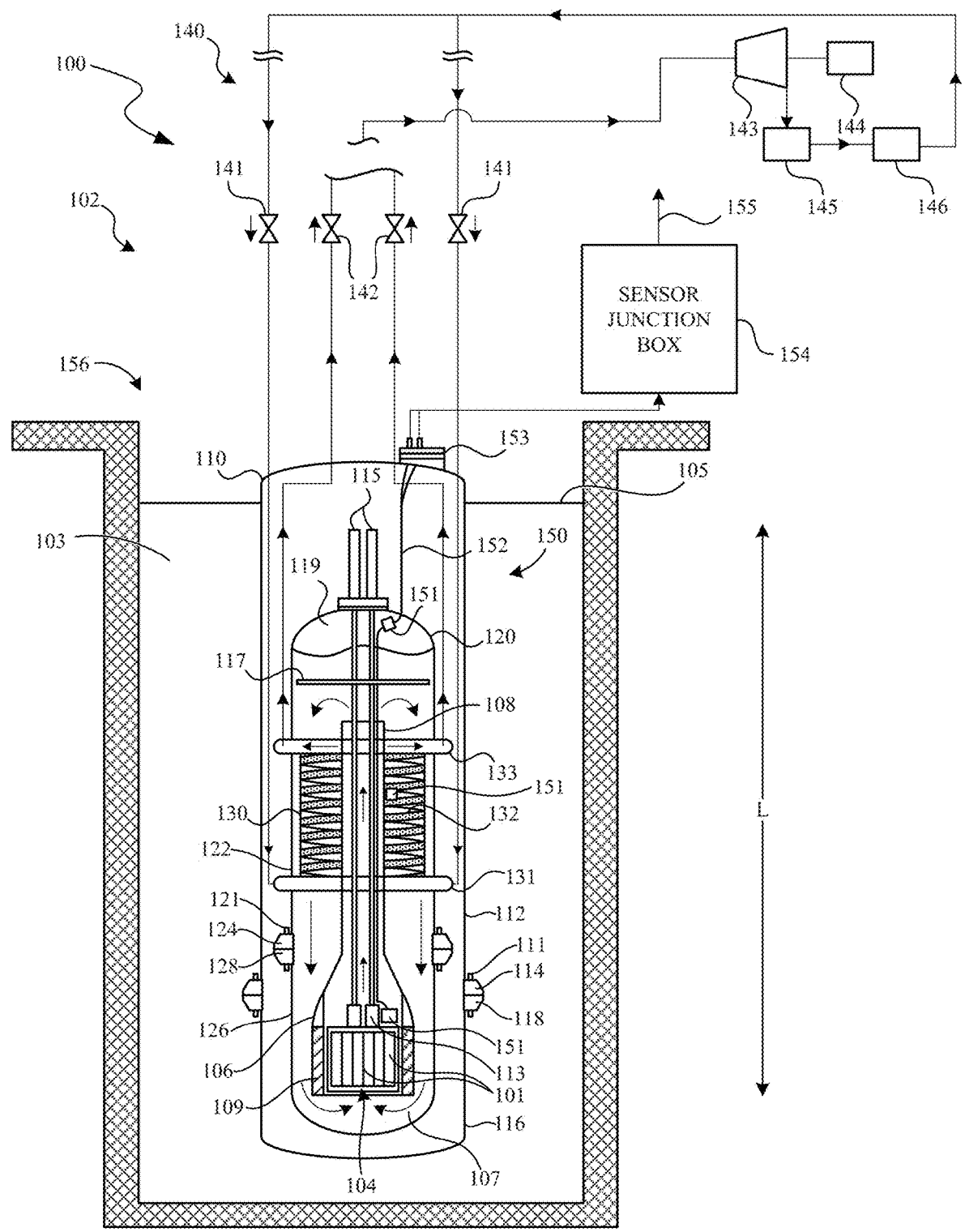
FIG. 1 is a partially schematic, partially cross-sectional view of a nuclear reactor system in accordance with embodiments of the present technology.

Aspects of the present disclosure are directed generally toward pressure vessels and closures for pressure vessels, such as for use in nuclear reactor systems. In several of the embodiments described below, a representative pressure vessel includes (i) a first enclosure including a first flange having a lower surface and a first inner surface, and (ii) a second enclosure including a second flange having an upper surface and a second inner surface. The pressure vessel can further include a sealing member having a first portion and a second portion. The first and second portions can have different shapes and/or sizes such that sealing member has, for example, a T-shape or H-shape in cross-section. The first portion of the sealing member is configured to contact both the lower surface of the first flange and the upper surface of the second flange to provide a first seal between the first and second enclosures via, for example, a compressive force exerted by the first and second flanges against the first portion. The second portion of the sealing member is configured to contact, via an interference fit, both the first inner surface of the first flange and the second inner surface of the second flange to provide a second seal between the first and second enclosures.

Accordingly, in some aspects of the present technology the sealing member provides a dual seal at the interface between the first and second flanges. In some additional aspects of the present technology, the sealing member is configured such that the maximum contact pressure distributions at the sealing surfaces of the first and second portions always exceed an applied pressure within the pressure vessel such that the sealing member will be leak-tight. Moreover, the stresses on the sealing member during installation, testing, and operation can all be distributed such that the sealing member undergoes no—or approximately no—plastic deformation. Accordingly, the sealing member can be reused and re-installed multiple times. In contrast, conventional O-ring seals distribute contact pressures across a much smaller area such that they undergo plastic deformation during use and cannot be reused. Such O-rings can be expensive to manufacture and to dispose of (e.g., due to irradiation in nuclear applications). Accordingly, the sealing members of the present technology can reduce the cost of operating pressure vessels compared to conventional systems by permitting the sealing members to be reused.

Certain details are set forth in the following description and in FIGS. 1-10B to provide a thorough understanding of various embodiments of the present technology. In other instances, well-known structures, materials, operations, and/or systems often associated with nuclear reactors, vessel closures, clamps, gaskets, seals, and the like, are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth. The terminology used below is to be interpreted in its broadest reasonable manner, even though it is being used in conjunction with a detailed description of certain examples of embodiments of the technology.

The accompanying Figures depict embodiments of the present technology and are not intended to limit its scope unless expressly indicated. The sizes of various depicted elements are not necessarily drawn to scale, and these various elements may be enlarged to improve legibility. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the disclosure. Accordingly, other embodiments can have other details, dimensions, angles and features without departing from the present technology. In addition, those of ordinary skill in the art will appreciate that further embodiments of the present technology can be practiced without several of the details described below.

FIG. 1 is a partially schematic, partially cross-sectional view of a nuclear reactor system 100 in accordance with embodiments of the present technology. The system 100 can include a power module 102 having a reactor core 104 in which a controlled nuclear reaction takes place. Accordingly, the reactor core 104 can include one or more fuel assemblies 101. The fuel assemblies 101 can include fissile and/or other suitable materials. Heat from the reaction generates steam at a steam generator 130, which directs the steam to a power conversion system 140. The power conversion system 140 generates electrical power, and/or provides other useful outputs. A sensor system 150 is used to monitor the operation of the power module 102 and/or other system components. The data obtained from the sensor system 150 can be used in real time to control the power module 102, and/or can be used to update the design of the power module 102 and/or other system components.

The power module 102 includes a containment vessel 110 that houses/encloses a reactor pressure vessel 120, which in turn houses the reactor core 104. The containment vessel 110 can be housed in a power module bay 156. The power module bay 156 can contain a cooling pool 103 filled with water and/or another suitable cooling liquid. The bulk of the power module 102 can be positioned below a surface 105 of the cooling pool 103. Accordingly, the cooling pool 103 can operate as a thermal sink, for example, in the event of a system malfunction.

In the illustrated embodiment, the containment vessel 110 includes a first portion 112 (e.g., an upper portion, a first enclosure, a first vessel portion, a top, a head) having a first flange 114 and a second portion 116 (e.g., a lower portion, a second enclosure, a second vessel portion, a bottom) having a second flange 118. The first flange 114 can be removably coupled (e.g., clamped) to the second flange 118 via for example, one or more bolts 111 to secure the first portion 112 to the second portion 116. In other embodiments, the first and second flanges 114, 118 can be secured together using other features, such as a clamp device described in further detail below with reference to FIGS. 10A and 10B To access components housed within the containment vessel 110 (e.g., the reactor pressure vessel 120), the first and second flanges 114, 118 can be detached from one another (e.g., by removing the bolts 111) and the first and second portions 112, 116 of the containment vessel 110 can be separated from one another.

Similarly, in the illustrated embodiment the reactor pressure vessel 120 includes a first portion 122 (e.g., an upper portion, a first enclosure, a first vessel portion, a top, a head) having a first flange 124 and a second portion 126 (e.g., a lower portion, a second enclosure, a second vessel portion, a bottom) having a second flange 128. The first flange 124 can be removably coupled (e.g., clamped) to the second flange 128 via for example, one or more bolts 121 to secure the first portion 122 to the second portion 126. In other embodiments, the first and second flanges 124, 128 can be secured together using other features, such as the clamp device described in further detail below with reference to FIGS. 10A and 10B. To access components housed within the reactor pressure vessel 120 (e.g., the reactor core 104), the first and second flanges 124, 128 can be detached from one another (e.g., by removing the bolts 121) and the first and second portions 122, 126 of the reactor pressure vessel 120 can be separated from one another.

A volume between the reactor pressure vessel 120 and the containment vessel 110 can be partially or completely evacuated to reduce heat transfer from the reactor pressure vessel 120 to the surrounding environment (e.g., to the cooling pool 103). However, in other embodiments the volume between the reactor pressure vessel 120 and the containment vessel 110 can be at least partially filled with a gas and/or a liquid that increases heat transfer between the reactor pressure vessel 120 and the containment vessel 110.

Within the reactor pressure vessel 120, a primary coolant 107 conveys heat from the reactor core 104 to the steam generator 130. For example, as illustrated by arrows located within the reactor pressure vessel 120, the primary coolant 107 is heated at the reactor core 104 toward the bottom of the reactor pressure vessel 120. The heated primary coolant 107 (e.g., water with or without additives) rises from the reactor core 104 through a core shroud 106 and to a riser tube 108. The hot, buoyant primary coolant 107 continues to rise through the riser tube 108, then exits the riser tube 108 and passes downwardly through the steam generator 130. The steam generator 130 includes a multitude of conduits 132 that are arranged circumferentially around the riser tube 108, for example, in a helical pattern, as is shown schematically in FIG. 1. The descending primary coolant 107 transfers heat to a secondary coolant (e.g., water) within the conduits 132, and descends to the bottom of the reactor pressure vessel 120 where the cycle begins again. The cycle can be driven by the changes in the buoyancy of the primary coolant 107, thus reducing or eliminating the need for pumps to move the primary coolant 107.

The steam generator 130 can include a feedwater header 131 at which the incoming secondary coolant enters the steam generator conduits 132. The secondary coolant rises through the conduits 132, converts to vapor (e.g., steam), and is collected at a steam header 133. The steam exits the steam header 133 and is directed to the power conversion system 140.

The power conversion system 140 can include one or more steam valves 142 that regulate the passage of high pressure, high temperature steam from the steam generator 130 to a steam turbine 143. The steam turbine 143 converts the thermal energy of the steam to electricity via a generator 144. The low-pressure steam exiting the turbine 143 is condensed at a condenser 145, and then directed (e.g., via a pump 146) to one or more feedwater valves 141. The feedwater valves 141 control the rate at which the feedwater re-enters the steam generator 130 via the feedwater header 131.

The power module 102 includes multiple control systems and associated sensors. For example, the power module 102 can include a hollow cylindrical reflector 109 that directs neutrons back into the reactor core 104 to further the nuclear reaction taking place therein. Control rods 113 are used to modulate the nuclear reaction, and are driven via fuel rod drivers 115. The pressure within the reactor pressure vessel 120 can be controlled via a pressurizer plate 117 (which can also serve to direct the primary coolant 107 downwardly through the steam generator 130) by controlling the pressure in a pressurizing volume 119 positioned above the pressurizer plate 117.

The sensor system 150 can include one or more sensors 151 positioned at a variety of locations within the power module 102 and/or elsewhere, for example, to identify operating parameter values and/or changes in parameter values. The data collected by the sensor system 150 can then be used to control the operation of the system 100, and/or to generate design changes for the system 100. For sensors positioned within the containment vessel 110, a sensor link 152 directs data from the sensors to a flange 153 (at which the sensor link 152 exits the containment vessel 102) and directs data to a sensor junction box 154. From there, the sensor data can be routed to one or more controllers and/or other data systems via a data bus 155.

Figure 2:
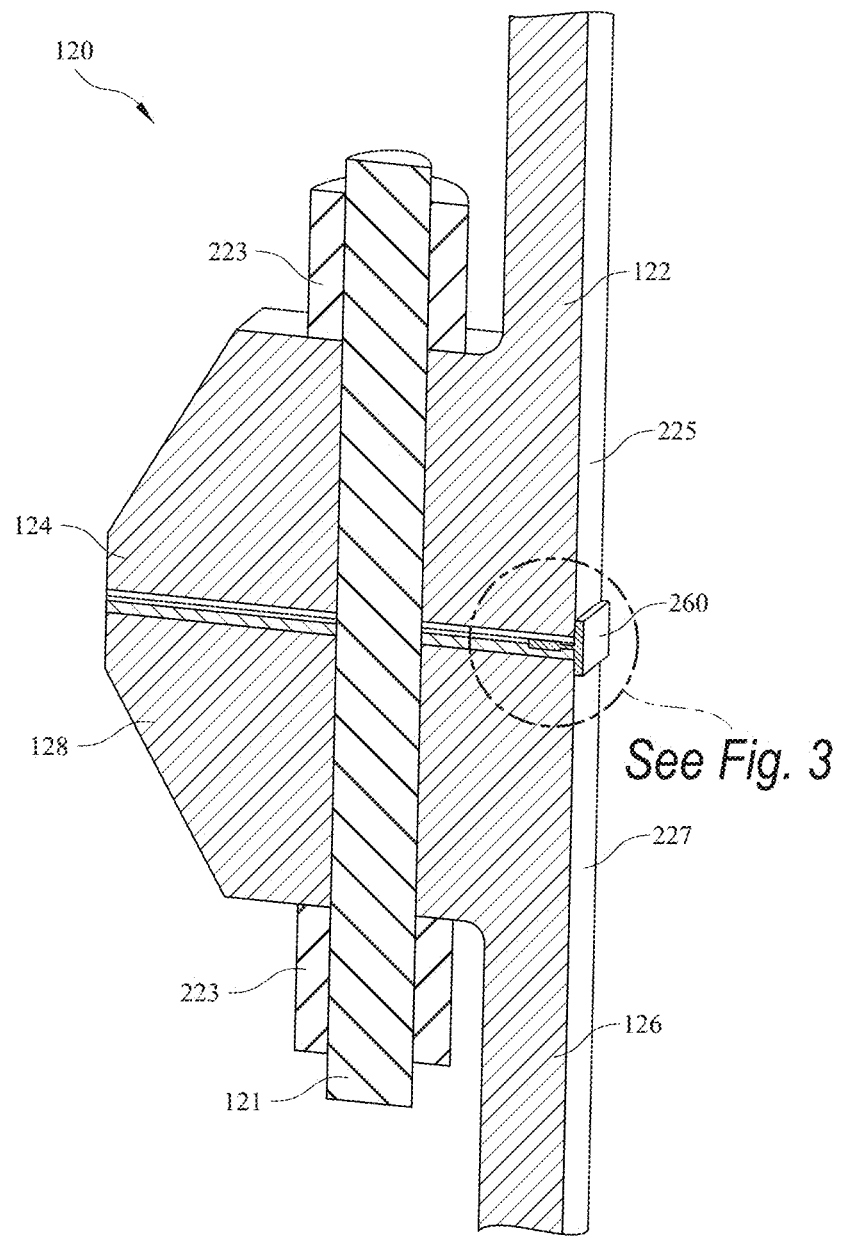
FIG. 2 is an enlarged isometric side cross-sectional view of a first flange and a second flange of a reactor pressure vessel of the nuclear reactor system of FIG. 1 in accordance with embodiments of the present technology.

FIG. 2 is an enlarged isometric side cross-sectional view of the first flange 124 and the second flange 128 of the reactor pressure vessel 120 of FIG. 1 in accordance with embodiments of the present technology. The first and second flanges 124, 128 can be secured together via the bolts 121 and corresponding of fasteners 223 (e.g., nuts, threaded fasteners). In some embodiments, the first and second flanges 124, 128 can have some features, shapes, configurations, properties, and the like that are generally similar or identical to those of the flanges and/or pressure vessels described in detail in U.S. patent application Ser. No. 16/221,088, titled "COMPACT RAISED FACE FLANGE," and filed Dec. 14, 2018, which is incorporated herein by reference in its entirety.

The first portion 122 of the reactor pressure vessel 120 has a first inner surface 225, and the second portion 126 of the reactor pressure vessel 120 has a second inner surface 227 that together bound an inner volume of the reactor pressure vessel 120. In the illustrated embodiment, a sealing member 260 is positioned between the first and second portions 122, 126 of the reactor pressure vessel 120 and is configured to seal an interface therebetween. The sealing member 260 can have a generally circular or ring shape and can extend entirely around a circumference of the reactor pressure vessel 120, for example, at and/or outwardly from the inner surfaces 225, 227.

Figure 3:
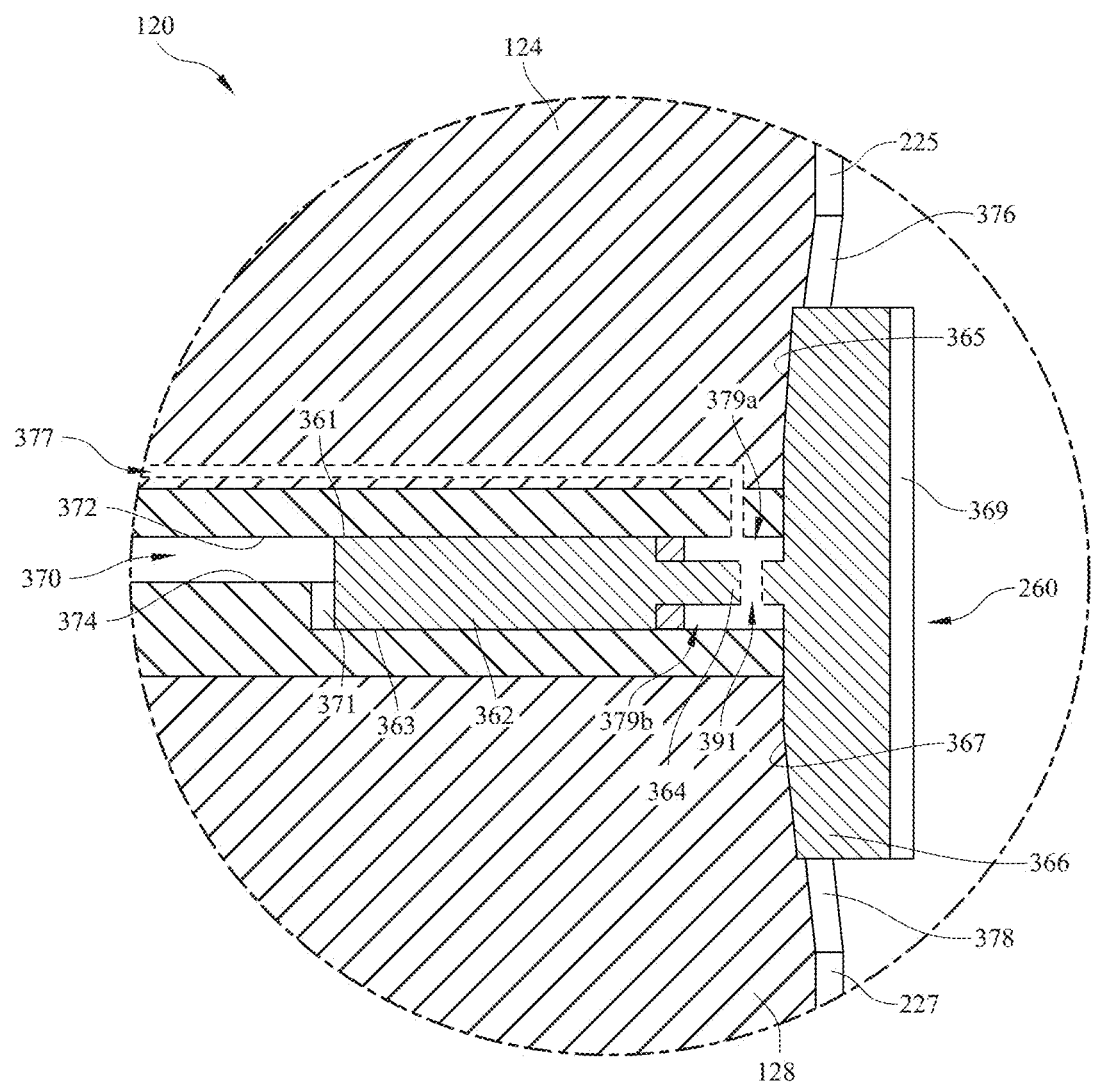
FIG. 3 is an enlarged isometric cross-sectional view of the first flange, the second flange, and a sealing member of the reactor pressure vessel of FIG. 2 in accordance with embodiments of the present technology.

FIG. 3 is an enlarged isometric cross-sectional view of the sealing member 260, the first flange 124, and the second flange 128 of the reactor pressure vessel 120 shown in FIG. 2, configured in accordance with embodiments of the present technology. In the illustrated embodiment, the first and second flanges 124, 128 bound or define a channel or groove 370 therebetween. More specifically, the first flange 124 can have a lower surface 372 that is spaced apart from and faces an upper surface 374 of the second flange 128 to bound or define the groove 370. Moreover, in the illustrated embodiment the first inner surface 225 includes a first angled surface portion 376 (e.g., a first non-parallel surface portion) proximate to the groove 370 and the second inner surface 227 includes a second angled surface portion 378 (e.g., a second non-parallel surface portion) proximate to the groove 370. The first and second angled surface portions 376, 378 can be angled relative to a longitudinal axis L (FIG. 1) of the reactor pressure vessel 120.

In some embodiments, the sealing member 260 has a generally T-like cross-sectional shape including a first portion 362 (e.g., a first stem portion), a second portion 364 (e.g., a second stem portion), and a third portion 366 (e.g., a crossmember, a tapered portion). When the first and second flanges 124, 128 are secured together via, for example, the bolts 121 (FIGS. 1 and 2), the sealing member 260 seals the interface therebetween. More specifically, in the illustrated embodiment the first portion 362 is positioned within the groove 370 and includes (i) an upper surface 361 that at least partially sealingly contacts and engages the lower surface 372 of the first flange 124 and (ii) a lower surface 363 that at least partially sealingly contacts and engages the upper surface 374 of the second flange 128. Accordingly, the first portion 362 can have a generally rectangular cross-sectional shape and can be "sandwiched" between the first and second flanges 124, 128 to provide a first sealing interface or seal. In some embodiments, the upper surface 374 of the second flange 128 and/or the lower surface 372 of the first flange 124 can include a stepped portion 371 (illustrated in the second flange 128) for engaging and/or locating the first portion 362.

Further, the third portion 366 can be positioned within the volume enclosed by the reactor pressure vessel 120 and can sealingly contact and engage the first inner surface 225 of the first flange 124 and the second inner surface 227 of the second flange 128 to provide a second sealing interface or seal. More specifically, in the illustrated embodiment the third portion 366 includes (i) a first sealing surface 365 that at least partially sealingly contacts and engages the first angled surface portion 376 of the first flange 124 and (ii) a second sealing surface 367 that at least partially sealingly contacts and engages the second angled surface portion 378 of the second flange 128. In some embodiments, the first sealing surface 365, the second sealing surface 367, and first angled surface portion 376, and the second angled surface portion 378 are configured (e.g., shaped, sized) to provide an interference fit between the third portion 366 and the first and second flanges 124, 128. For example, a diameter of the sealing member 260 at the third portion 366 can be slightly greater than an inner diameter of the reactor pressure vessel 120 at the first and second angled surface portions 376, 378 to facilitate the interference fit. Additionally, when the volume inside the reactor pressure vessel 120 is pressurized (e.g., during system operation), the pressure can provide an outward force against an outer surface 369 of the third portion 366 to further urge the third portion 366 against and into sealing engagement with the first and second flanges 124, 128.

In some embodiments, the second portion 364 of the sealing member 260 can have a reduced thickness compared to the first portion 362 such that the second portion 364 does not contact the first and second flanges 124, 128 and defines or bounds one or more channels 379 (e.g., an individually identified first channel 379a and a second channel 379b) therebetween. The first flange 124 and/or the second flange 128 can include a fluid port 377 (a single fluid port 377 is shown schematically in the first flange 124) fluidly coupled to the channels 379. As described in greater detail below, fluid can be injected into the channels 379 via the fluid port(s) 377 to test the sealed interfaces between the sealing member 260 and the first and second flanges 124, 128. In some embodiments, the second portion 364 of the sealing member 260 can further include one or more fluid ports 391 (a single fluid port 391 is shown schematically in FIG. 3) extending therethrough and fluidly connecting the channels 379 to enable a fluid injected through the fluid port(s) 377 to enter both of the channels 379.

Figure 4:
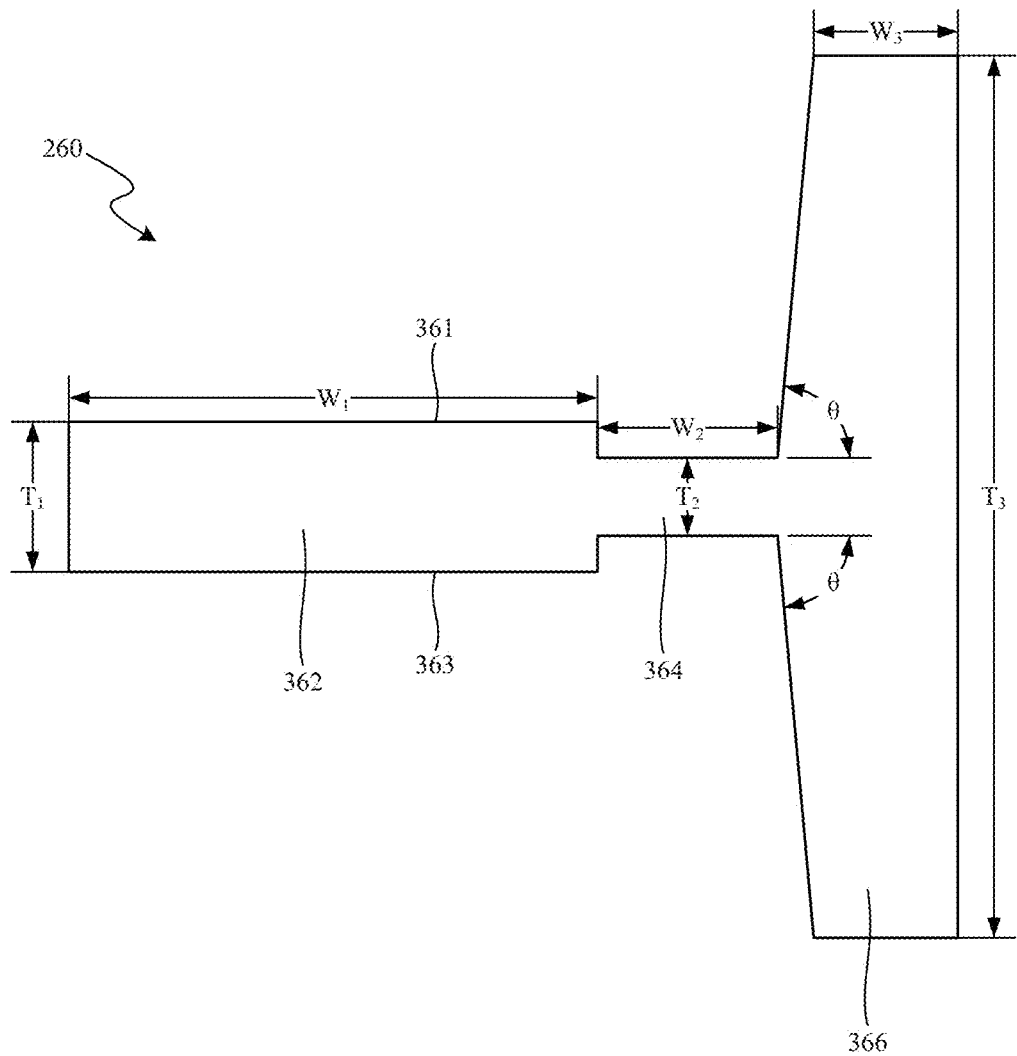
FIG. 4 is a side cross-sectional view of the sealing member of FIGS. 2 and 3 in accordance with embodiments of the present technology.

FIG. 4 is a side cross-sectional view of the sealing member 260, configured in accordance with embodiments of the present technology. In the illustrated embodiment, the first portion 362 has a first thickness $T_1$ and a first width $W_1$, the second portion 364 has a second thickness $T_2$ and a second width $W_2$, and the third portion 366 has a third thickness $T_3$ and a third width $W_3$. The first thickness $T_1$ can be greater than the second thickness $T_2$ and less than the third thickness $T_3$. The first width $W_1$ can be greater than the second width $W_2$ and greater than the third width $W_3$. In some embodiments, the first thickness $T_1$ can be between about 0.25-0.75 inch (e.g., about 0.5125 inch), the second thickness $T_2$ can be between about 0.1-0.5 inch (e.g., about 0.25 inch), and the third thickness $T_3$ can be between about 2-4 inches (e.g., about 3 inches). In some embodiments, the first width $W_1$ can be between about 1.25-2.25 inches (e.g., about 1.75 inches), the second width $W_2$ can be between about 0.25-1.0 inch, and the third width $W_3$ can be between about 0.25-0.75 inch (e.g., about 0.5 inch). The first and second sealing surfaces 365, 367 of the third portion 366 can extend at an angle $\theta$ of between about 80°-88° (e.g., about 85.125°) relative to the second portion 364 and the longitudinal axis L (FIG. 1). In other embodiments, the first portion 362, the second portion 364, and/or the third portion 366 can have different sizes, shapes, and/or dimensions. For example, in some embodiments, the first portion 362 can be wedge-shaped (e.g., with the upper surface 361 and/or the lower surface 363 being angled).

In some embodiments, the sealing member 260 can be formed of a metal or other high-strength and corrosion-resistant material, such as a nickel chromium alloy material (e.g., an alloy meeting the American Society of Mechanical Engineers SB-637 standard). In some embodiments, the sealing member 260 can be a seamless forged ring that is heat treated during manufacturing. In some embodiments, the sealing member 260 can be plated (e.g., silver plated) to accommodate scratches and manufacturing variances. In further embodiments, the sealing member 260 can be formed of a material having a coefficient of thermal expansion selected such that the sealing member 260 expands at operating temperatures of the system 100 (FIG. 1) to further engage and seal the interface between the first and second flanges 124, 128 (FIGS. 1-3).

Figure 5:
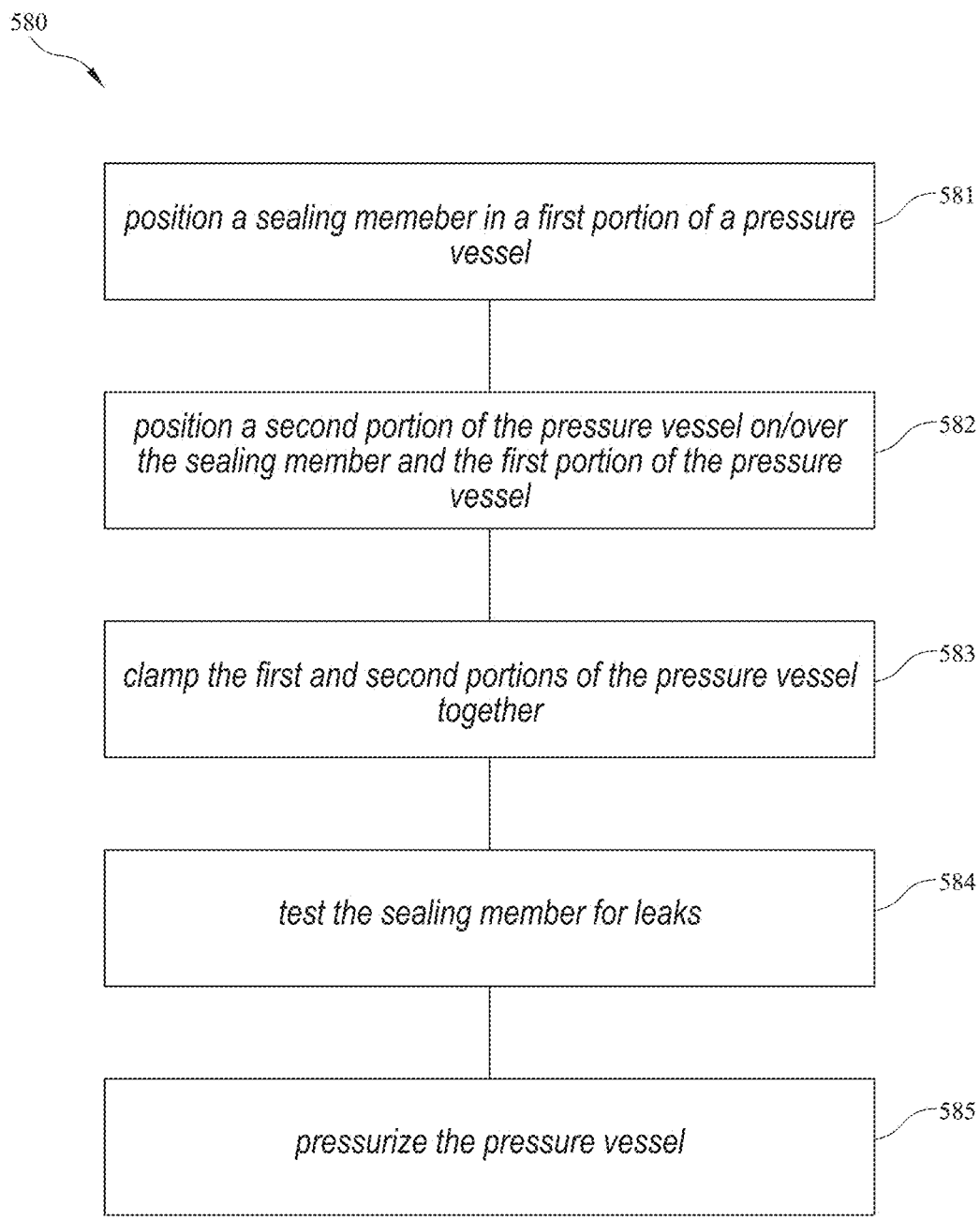
FIG. 5 is a flow diagram of a process or method for installing a sealing member and closing a pressure vessel in accordance with embodiments of the present technology.
Figure 6A:
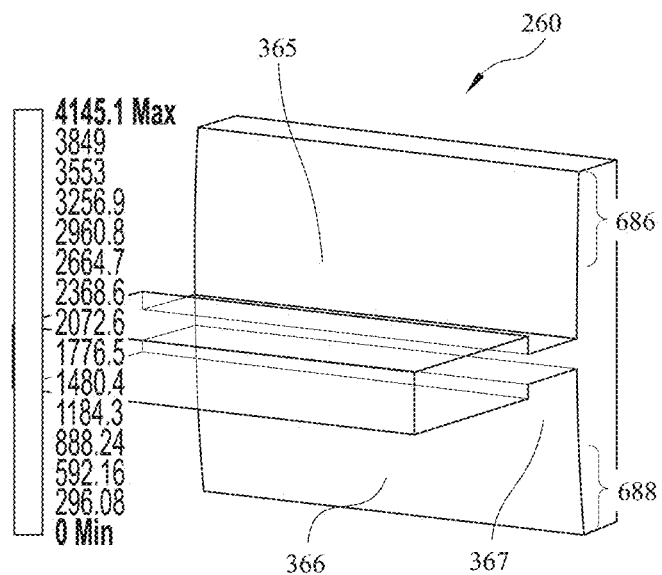
FIGS. 6A, 7A, and 8A are isometric views of the sealing member of FIGS. 2-4 illustrating different stress profiles of a portion of the sealing member during different stages of the method of FIG. 5 in accordance with embodiments of the present technology.
Figure 6B:
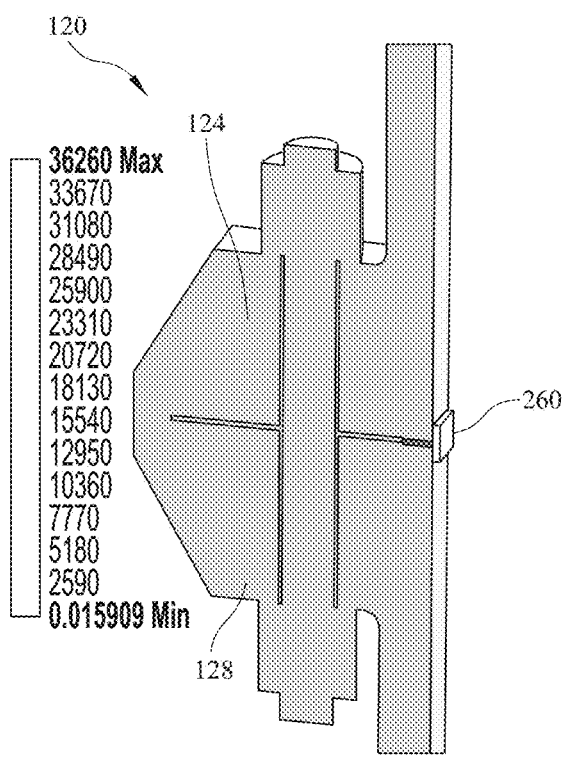
FIGS. 6B, 7C, and 8C are enlarged isometric side cross-sectional views of the reactor pressure vessel of FIG. 2 illustrating different stress profiles of the reactor pressure vessel during different stages of the method of FIG. 5 in accordance with embodiments of the present technology.
Figure 7A:
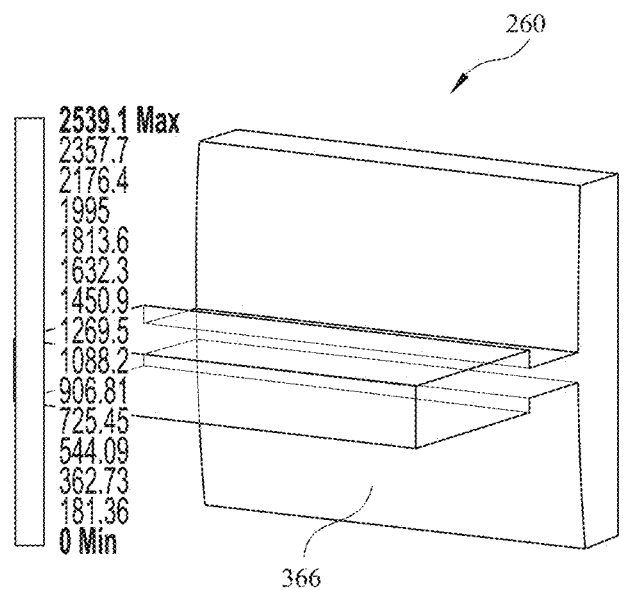
Figure 7B:
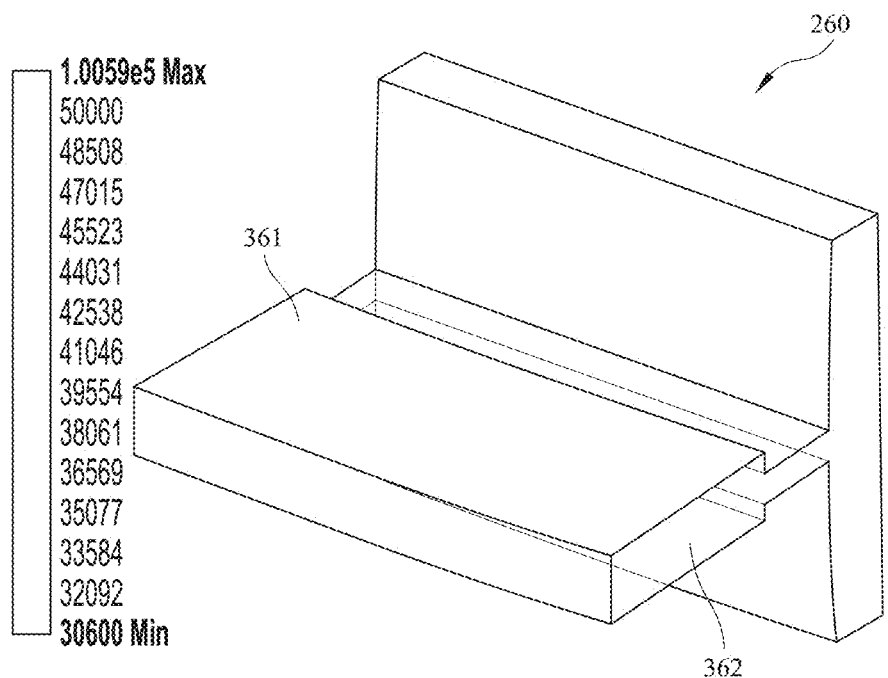
FIGS. 7B and 8B are isometric views of the sealing member of FIGS. 2-4 illustrating different stress profiles of another portion of the sealing member during different stages of the method of FIG. 5 in accordance with embodiments of the present technology.
Figure 7C:
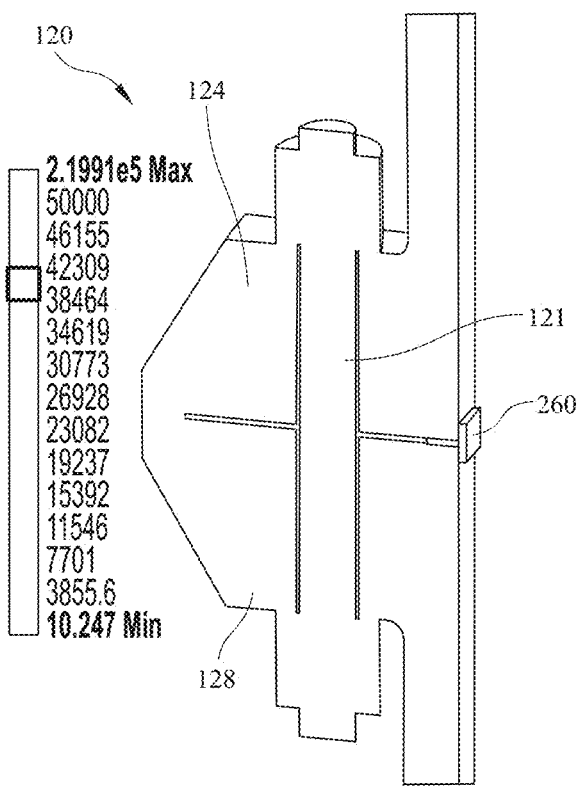
Figure 8A:
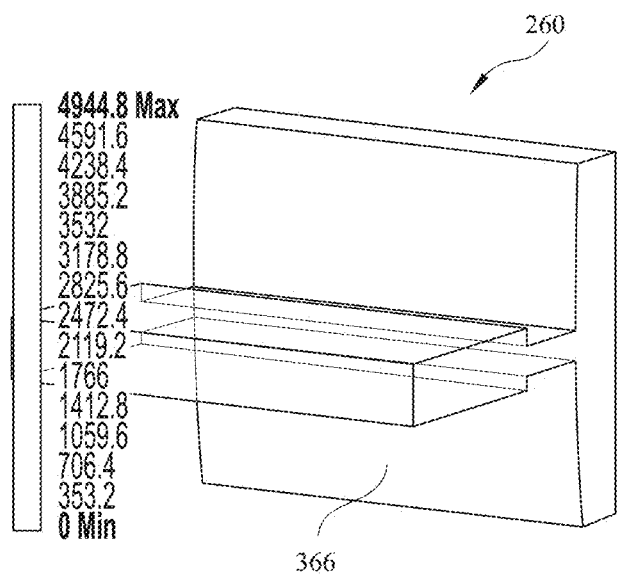
Figure 8B:
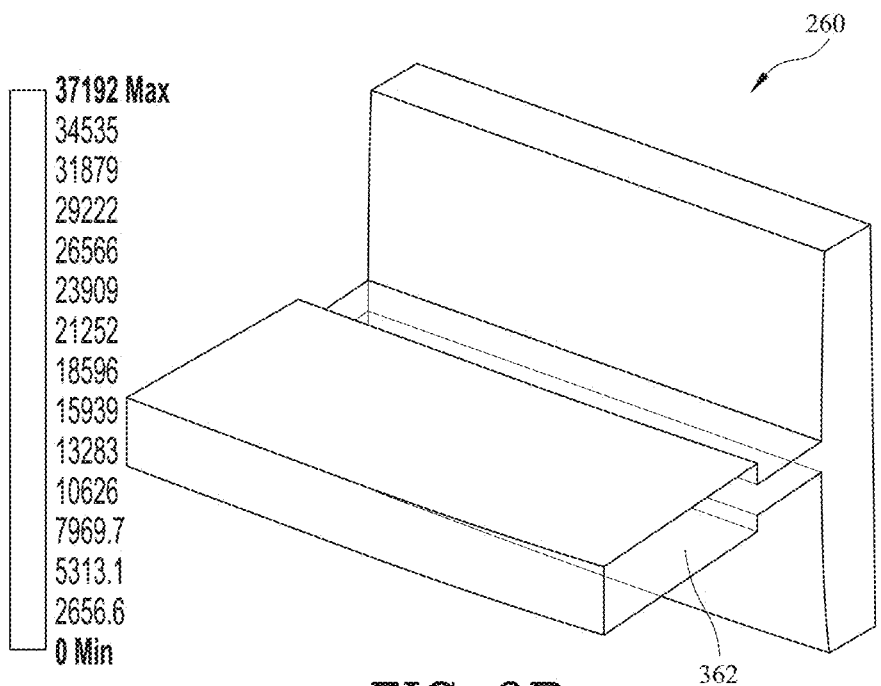
Figure 8C:
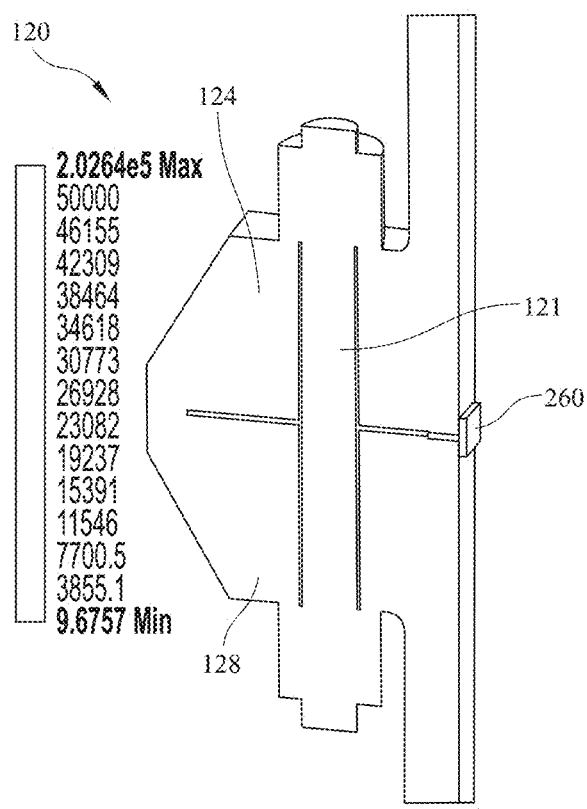

FIG. 5 is a flow diagram of a process or method 580 for installing a sealing member (e.g., the sealing member 260) and closing a pressure vessel (e.g., the reactor pressure vessel 120) in accordance with embodiments of the present technology. FIGS. 6A, 7A, and 8A are isometric views of the sealing member 260 illustrating different stress profiles of the third portion 366 of the sealing member 260 during different stages of the method 580 in accordance with embodiments of the present technology. FIGS. 7B and 8B are isometric views of the sealing member 260 illustrating different stress profiles of the first portion 362 of the sealing member 260 during different stages of the method 580 in accordance with embodiments of the present technology. FIGS. 6B, 7C, and 8C are enlarged isometric side cross-sectional views of the reactor pressure vessel 120 illustrating different stress profiles of the reactor pressure vessel 120 during different stages of the method 580 in accordance with embodiments of the present technology. Although some features of the method 580 are described in the context of the embodiments shown in FIGS. 1-4 and 6A-8C for the sake of illustration, one skilled in the art will readily understand that the method 580 can be carried out using other suitable systems and/or devices described herein.

At block 581, the method 580 includes positioning a sealing member in contact with a first portion of a pressure vessel. For example, the sealing member 260 can be positioned (e.g., lowered, seated) on the second flange 128 of the lower second portion 126 of the reactor pressure vessel 120. After positioning the sealing member 260, the first portion 362 can be positioned in contact with the upper surface 374 of the second flange 128 and the second sealing surface 367 of the third portion 366 can contact the second angled surface portion 378 of the second flange 128.

At block 582, the method 580 can include positioning (e.g., installing) a second portion of the pressure vessel on/over the sealing member and the first portion of the pressure vessel. For example, the first portion 122 of the reactor pressure vessel 120 can be positioned over the second portion 126 with the sealing member 260 therebetween. After positioning the first portion 122 of the reactor pressure vessel 120, the first portion 362 of the sealing member 260 can be clamped/compressed between the lower surface 372 of the first flange 124 and the upper surface 374 of the second flange 128 (e.g., as best seen in FIG. 3). Likewise, the third portion 366 of the sealing member 260 can engage and contact the first and second angled surface portions 376, 378 of the first and second flanges 124, 128, respectively. In some embodiments, as the first portion 122 of the reactor pressure vessel 120 is lowered onto the second portion 126, the engagement of the third portion 366 of the sealing member 260 with the first and second flanges 124, 128 (e.g., the engagement of the first and second angled sealing surfaces 365, 367 with the first and second angled surface portions 376, 378, respectively) can draw the sealing member 260 outward and further into/toward the groove 370.

FIGS. 6A and 6B respectively illustrate the stress profiles of the third portion 366 of the sealing member 260 and the reactor pressure vessel 120 after block 582 (e.g., after installing/assembling the reactor pressure vessel components). As shown in FIGS. 6A and 6B, the sealing member 260 can bear most of the stress in the system 100 at this stage. Moreover, as shown in FIG. 6A, (i) the first sealing surface 365 of the third portion 366 can contact the first angled surface portion 376 of the first flange 124 (FIG. 3) at a significant contact pressure only at a first contact region 686 thereof and (ii) the second sealing surface 367 of the third portion 366 can contact the second angled surface portion 378 of the second flange 128 (FIG. 3) at a significant contact pressure only at a second contact region 688 thereof. In the illustrated embodiment, the first and second contact regions 686, 688 are outer regions of the third portion 366 and provide the sealed interface between the third portion 366 and the first and second flanges 124, 128. In other embodiments, more or less of the third portion 366 can contact the first and second flanges 124, 128 at a significant contact pressure. In some embodiments, a maximum contact pressure between the third portion 366 and the first and second flanges 124, 128 can be between about 4,000-5,000 pounds per square inch (psi) (e.g., about 4,145 PSI) and an average contact pressure between the third portion 366 and the first and second flanges 124, 128 can be between about 1,000-1,500 psi (e.g., about 1,100 psi).

Referring again to FIG. 5, at block 583, the method 580 includes clamping the first and second portions of the pressure vessel together. For example, the bolts 121 can be tightened against the fasteners 223 to tightly secure the first and second flanges 124, 128 of the reactor pressure vessel 120 together. In other embodiments, the first and second flanges 124, 128 can be clamped together with a clamping device (e.g., as described in detail below with reference to FIGS. 10A and 10B). FIGS. 7A-7C respectively illustrate the stress profiles of the third portion 366 of the sealing member 260, the first portion 362 of the sealing member 260, and the reactor pressure vessel 120 after block 583 (e.g., after loading the bolts 121). As shown in FIG. 7C, loading the bolts 121 can increase the stress on the bolts 121 and the first and second flanges 124, 128. Moreover, as shown in FIGS. 7A and 7C, loading the bolts 121 can (i) significantly increase the contact pressure of the first portion 362 of the sealing member 260 against the first and second flanges 124, 128 while (ii) reducing the contact pressure of the third portion 366 against the first and second flanges 124, 128. In some embodiments, the contact pressure is distributed over at least approximately all of the upper and lower surfaces 361, 363 of the first portion 362. In some embodiments, a maximum contact pressure between the first portion 362 and the first and second flanges 124, 128 can be between about 90,000-100,000 psi (e.g., about 100,000 psi) and an average contact pressure between the first portion 362 and the first and second flanges 124, 128 can be between about 40,000-50,000 psi (e.g., about 44,000 psi). In some embodiments, a maximum contact pressure between the third portion 366 and the first and second flanges 124, 128 can be between about 2,000-3,000 psi (e.g., about 2,540 psi) and an average contact pressure between the third portion 366 and the first and second flanges 124, 128 can be between about 1,000-2,000 psi (e.g., about 1,340 psi).

At block 584 the method 580 can include testing the sealing member for leaks. For example, as best seen in FIG. 3, fluid can be injected through the fluid port 377 and into the channels 379 (e.g., and subsequently through the fluid port(s) 391 in the second portion 364 of the sealing member 260) to pressurize the various sealing surfaces of the sealing member 260. The pressure can be substantially equal to an operating pressure of the reactor pressure vessel after the pressure vessel is pressurized (block 585). In this manner, any leaks can be identified.

At block 585, the method 580 can include pressurizing the pressure vessel. For example, the pressure within the reactor pressure vessel 120 can be increased to an operating pressure and/or a test pressure (e.g., between about 2,000-3,000 psi) by controlling the reactor core 104 to heat the coolant 107 to an operating or test temperature. FIGS. 8A-8C respectively illustrate the stress profiles of the third portion 366 of the sealing member 260, the first portion 362 of the sealing member 260, and the reactor pressure vessel 120 after block 585 (e.g., after pressurizing the reactor pressure vessel 120). As shown in FIG. 8C, pressurizing the reactor pressure vessel 120 can generally increase (e.g., slightly increase) the stress on the bolts 121 while generally reducing (e.g., slightly reducing) the stress on the first and second flanges 124, 128. The stress distribution can be generally uniform throughout the first and second flanges 124, 128. Moreover, as shown in FIGS. 8A and 8B, pressurizing the reactor pressure vessel 120 can (i) decrease the contact pressure of the first portion 362 of the sealing member 260 against the first and second flanges 124, 128 while (ii) increasing the contact pressure of the third portion 366 against the first and second flanges 124, 128 (e.g., due to outward pressure against the outer surface 369 of the third portion 366). In some embodiments, a maximum contact pressure between the first portion 362 and the first and second flanges 124, 128 can be between about 20,000-40,000 psi (e.g., about 23,700 psi, about 37,200 psi) and an average contact pressure between the first portion 362 and the first and second flanges 124, 128 can be between about 2,000-10,000 psi (e.g., about 3,500 psi about 9,200 psi). In some embodiments, a maximum contact pressure between the third portion 366 and the first and second flanges 124, 128 can be between about 3,000-5,000 psi (e.g., about 3,490 psi, about 4,950 psi) and an average contact pressure between the third portion 366 and the first and second flanges 124, 128 can be between about 1,000-2,000 psi (e.g., about 1,090 psi, about 1,230 psi).

Referring to FIGS. 6A-8C together, in some aspects of the present technology the sealing member 260 is configured such that the maximum contact pressures at the sealing surfaces of the sealing member—that is, at the upper and lower surfaces 361, 363 of the first portion 362 and the first and second sealing surfaces 365, 367 of the third portion 366—always exceed an applied pressure within the reactor pressure vessel 120 such that the sealing member will be leak-tight. Moreover, the stresses on the sealing member 260 during installation, testing, and operation can all be distributed such that the sealing member 260 does not undergo any or substantially any plastic deformation. Accordingly, the sealing member 260 can be reused and re-installed multiple times. In contrast, conventional O-ring seals distribute contact pressures across a much smaller area such that they undergo plastic deformation during use and cannot be reused. Such O-rings can be expensive to manufacture and to dispose of (e.g., due to irradiation). Accordingly, the cost of operating the nuclear reactor system 100 (FIG. 1) can be reduced compared to conventional systems through reuse of the sealing members of the present technology.

Figure 9:
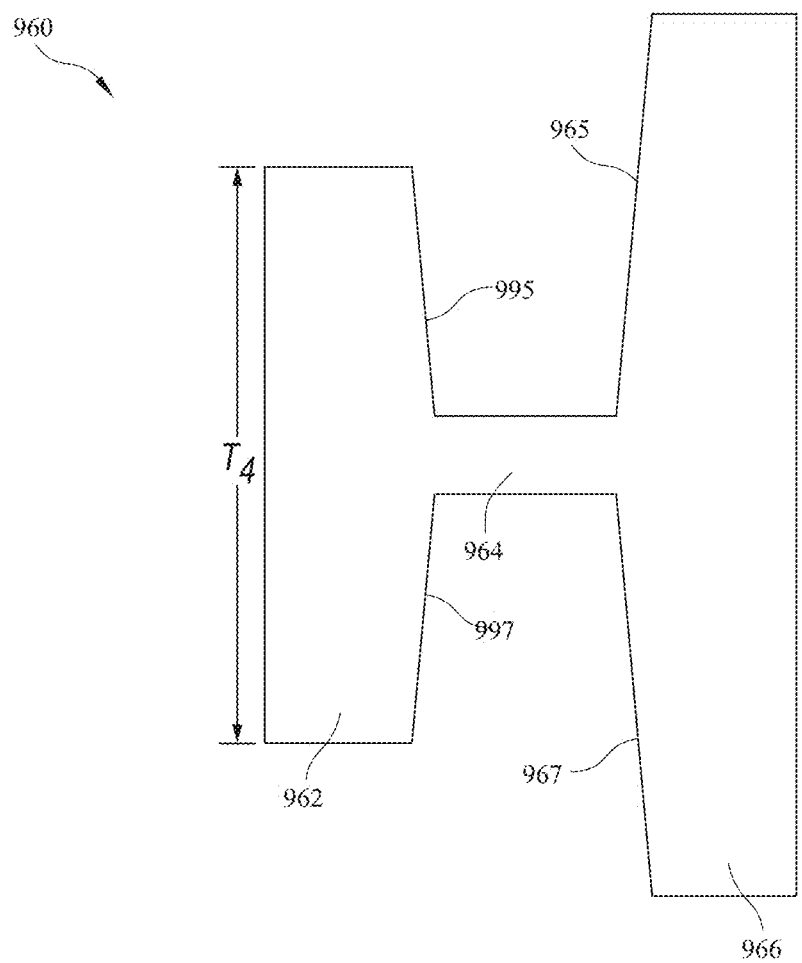
FIG. 9 is a side cross-sectional view of a sealing member in accordance with additional embodiments of the present technology.

FIG. 9 is a side cross-sectional view of a sealing member 960 in accordance with additional embodiments of the present technology. The sealing member 960 can include some features that are at least generally similar in structure and function, or identical in structure and function, to the corresponding features of the sealing member 260 described in detail above with reference to FIGS. 2-8C, and can operate in a generally similar or identical manner to the sealing member 260. In the illustrated embodiment, for example, the sealing member 960 includes a first portion 962, a second portion 964, and a third portion 966. With additional reference to FIG. 3, the first portion 962 is configured to be positioned between the first and second flanges 124, 128. The second portion 964 has a reduced diameter to facilitate leak-testing. The third portion 966 can include a first sealing surface 965 and a second sealing surface 967 configured (e.g., angled, shaped, sized) to sealingly engage the first and second angled surface portions 376, 378 of the first and second flanges 124, 128, respectively, via an interference fit.

In the illustrated embodiment, however, the first portion 962 has a relatively greater thickness $T_4$ than the thickness $T_1$ of the first portion 362 of the sealing member 260 (FIG. 4). Additionally, the first portion 962 includes an angled first sealing surface 995 and an angled second sealing surface 997. Accordingly, the sealing member 960 can have a generally H-like shape. The first sealing surface 995 of the first portion 962 can generally face the first sealing surface 965 of the third portion 966, and the second sealing surface 997 of the first portion 962 can generally face the second sealing surface 967 of the third portion 966. With additional reference to FIG. 3, the first and second flanges 124, 128 can together define or bound a groove therebetween (not shown) configured (e.g., sized, shaped, positioned) to receive the first portion 962 of the sealing member 960. In some embodiments, the groove can have a pair of angled surfaces (e.g., similar to the first and second angled surface portions 376, 378) configured to sealingly engage the first and second sealing surfaces 995, 997 via an interference fit. That is, the first portion 962 can provide an interference fit with the groove similar to the third portion 966 described in detail above. Thus, in contrast to the sealing member 260 described with reference to FIGS. 2-8C, the first portion 962 can seal the interface between the first and second flanges 124, 128 via the interference fit rather than as a result of any compressive forces imparted thereon. In some aspects of the present technology, the sealing member 960 can allow for improved and more uniform control of the contact pressures on the sealing surfaces—that is, the first and second sealing surfaces 995, 997 of the first portion 962 and the first and second sealing surfaces 965, 967 of the third portion 966—via optimization of the angles of the sealing surfaces relative to the corresponding surfaces of the first and second flanges 124, 128.

Figure 10B:
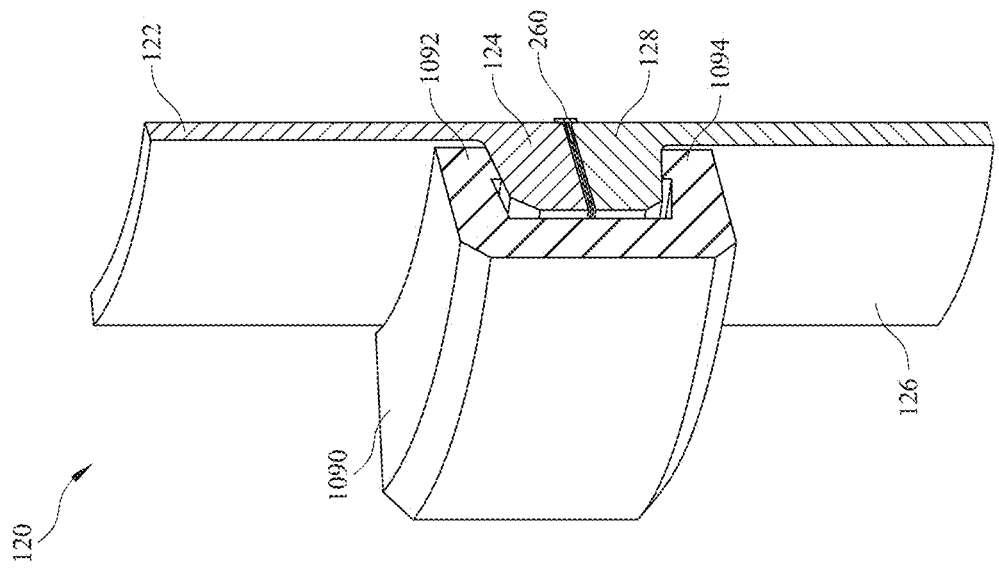
FIGS. 10A and 10B are enlarged isometric views of a portion of the first flange and the second flange of the reactor pressure vessel of FIG. 1 in accordance with additional embodiments of the present technology.
Figure 10A:
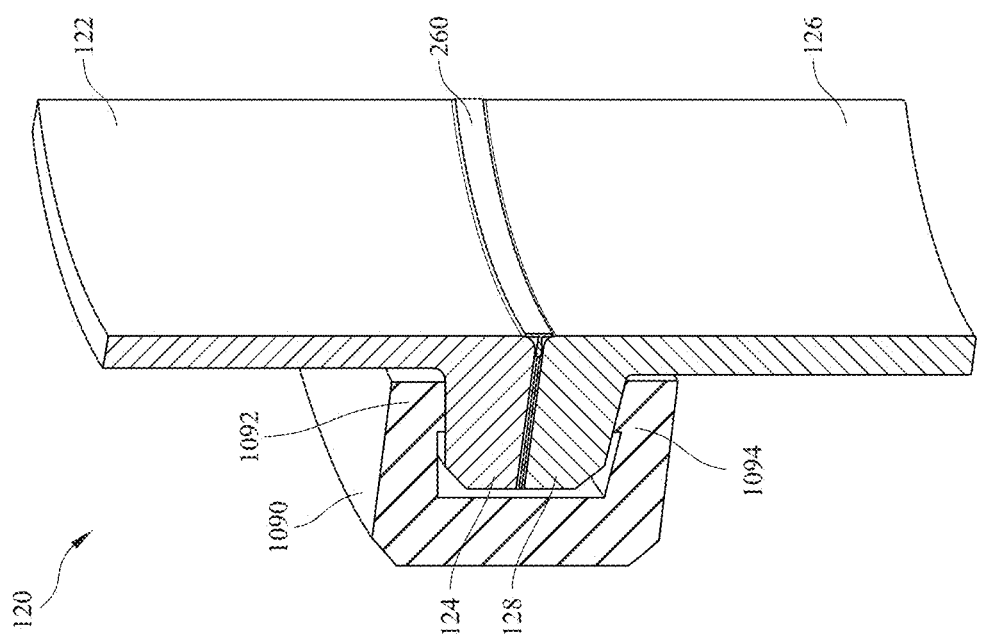

FIGS. 10A and 10B are enlarged isometric views of a portion of the first flange 124 and the second flange 128 of the reactor pressure vessel 120 of FIG. 1, configured in accordance with additional embodiments of the present technology. Referring to FIGS. 10A and 10B together, in the illustrated embodiment, the first and second flanges 124, 128 are secured together via a clamp device 1090 rather than a plurality of bolts and fasteners. More specifically, the clamp device 1090 can include a first portion 1092 configured to contact the first flange 124 (e.g., an upper or outer surface of the first flange 124) and a second portion 1094 opposite the first portion 1092 and configured to contact the second flange 128 (e.g., a lower or outer surface of the second flange 128). The clamp device 1090 can further include an actuator (not shown) or other mechanism for forcing the first and second portions 1092, 1094 toward one another to clamp the first and second flanges 124, 128 (and the sealing member 260) therebetween. In some embodiments, the clamp device 1090 can exert a clamping force against the first and second flanges 124, 128 proximate to the walls of the first and second portions 122, 126 of the reactor pressure vessel 120. Accordingly, a size (e.g., diameter) of the first and second flanges 124, 128 can be reduced compared to, for example, the bolted connection illustrated in FIGS. 1 and 2.

Referring again to FIG. 1, in some embodiments the first portion 112 of the containment vessel 110 can be sealingly secured to and installed on the second portion 116 of the containment vessel 110 in a generally similar or identical manner as the reactor pressure vessel 120 described in detail above with reference to FIGS. 2-10B. For example, a T-shaped or H-shaped sealing member can be provided between the first and second flanges 114, 118 of the containment vessel 110, and the first and second flanges 124, 128 can be clamped together via a clamping device or bolted connection. Similarly, the sealing members of the present technology can be used in other components within the system 100, such as to seal pipes, conduits, and/or other pressurized or unpressurized vessels.

The following examples are illustrative of several embodiments of the present technology:

1. A sealing member for sealing an interface between a first vessel portion of a pressure vessel and a second vessel portion of the pressure vessel, the sealing member comprising:
    a first portion configured to be positioned between and contact the first vessel portion and the second vessel portion to provide a first seal; and
    a second portion configured to contact an inner surface of the first vessel portion and an inner surface of the second vessel portion to provide a second seal.
2. The sealing member of example 1 wherein the second portion is sized to contact the inner surfaces of the first and second vessel portions via an interference fit.
3. The sealing member of example 1 or example 2 wherein the second portion includes (a) a first angled surface configured to contact the inner surface of the first vessel portion and (b) a second angled surface configured to contact the inner surface of the second vessel portion.
4. The sealing member of any one of examples 1-3 wherein the first and second vessel portions bound a groove therebetween, and wherein the first portion includes (a) a first angled surface configured to contact a first surface of the groove and (b) a second angled surface configured to contact a second surface of the groove.
5. The sealing member of any one of examples 1-4 wherein—
    the first and second vessel portions bound a groove therebetween;
    the first portion includes (a) a first angled surface configured to contact a first surface of the groove and (b) a second angled surface configured to contact a second surface of the groove; and
    the second portion includes (a) a first angled surface configured to contact the inner surface of the first vessel portion and (b) a second angled surface configured to contact the inner surface of the second vessel portion.
6. The sealing member of any one of examples 1-5 wherein the first portion has a generally rectangular cross-sectional shape.
7. The sealing member of any one of examples 1-6 wherein the first portion has a thickness less than a thickness of the second portion.
8 The sealing member of any one of examples 1-7, further comprising a third portion extending between the first and second portions, wherein the third portion has a thickness less than a thickness of the first portion and less than a thickness of the second portion.
9. A pressure vessel, comprising:
    a first enclosure including a first flange having a lower surface and a first inner surface;
    a second enclosure including a second flange having an upper surface and a second inner surface; and
    a sealing member including a first portion and a second portion, wherein the first portion contacts both the lower surface of the first flange and the upper surface of the second flange to provide a first seal between the first and second enclosures, and wherein the second portion contacts both the first inner surface of the first flange and the second inner surface of the second flange to provide a second seal between the first and second enclosures.

10. The pressure vessel of example 9, further comprising a longitudinal axis, wherein the first inner surface is angled relative to the longitudinal axis, and wherein the second inner surface is angled relative to the longitudinal axis.

11. The pressure vessel of example 9 or example 10, further comprising a longitudinal axis, wherein the second portion of the sealing member includes a first surface angled relative to the longitudinal axis and a second surface angled relative to the longitudinal axis, wherein the first surface of the second portion contacts the first inner surface of the first flange, and wherein the second surface of the second portion contacts the second inner surface of the second flange.

12. The pressure vessel of example 11 wherein the first inner surface is angled relative to the longitudinal axis, and wherein the second inner surface is angled relative to the longitudinal axis.

13. The pressure vessel of any one of examples 9-12 wherein the second portion of the sealing member is secured in contact with the first inner surface of the first flange and the second inner surface of the second flange via an interference fit.

14. The pressure vessel of any one of examples 9-13 wherein the sealing member has a T-shape.

15. The pressure vessel of any one of examples 9-13 wherein the sealing member has an H-shape.

16. The pressure vessel of any one of examples 9-15 wherein the sealing member has a ring-like shape that extends adjacent to the first inner surface and the second inner surface.

17. The pressure vessel of any one of examples 9-16, further comprising a nuclear reactor core positioned within the first enclosure and/or the second enclosure.

18. The pressure vessel of any one of examples 9-17, further comprising a clamp device positioned to clamp the first flange to the second flange.

19. A method of sealing an interface between a first vessel portion of a reactor pressure vessel and a second vessel portion of a reactor pressure vessel, wherein the reactor pressure vessel houses a nuclear reactor core, the method comprising:
compressing a first portion of a sealing member between the first vessel portion and the second vessel portion to provide a first seal; and
contacting, via an interference fit, a second portion of the sealing member with an inner surface of the first vessel portion and an inner surface of the second vessel portion to provide a second seal.

20 The method of example 19 wherein the method further comprises not plastically deforming the sealing member while compressing and contacting.

The above detailed description of embodiments of the present technology are not intended to be exhaustive or to limit the technology to the precise forms disclosed above. Although specific embodiments of, and examples for, the technology are described above for illustrative purposes, various equivalent modifications are possible within the scope of the technology as those skilled in the relevant art will recognize. For example, although steps are presented in a given order, other embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the phrase "and/or" as in "A and/or B" refers to A alone, B alone, and A and B. To the extent any materials incorporated herein by reference conflict with the present disclosure, the present disclosure controls. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

The invention claimed is:

1. A pressure vessel, comprising:
a first flange having a lower surface and a first inner surface;
a second flange having an upper surface and a second inner surface;
a sealing member including:
a first portion extending in a first direction and configured to contact the lower surface and the upper surface, the first portion including:
a width, and
a first thickness,
a second portion extending from the first portion in the first direction, the second portion including a second thickness that is less than the first thickness, and
a third portion extending from the second portion in a second direction that is transverse to the first direction and configured to contact the first inner surface and the second inner surface, the third portion including a third thickness that is greater than the first thickness; and
a fluid port extending through the second portion in the second direction,
wherein the first portion provides a first seal between the first flange and the second flange, and
the third portion provides a second seal between the first flange and the second flange.

2. The pressure vessel of claim 1, further comprising a longitudinal axis, wherein the first inner surface is angled relative to the longitudinal axis, and wherein the second inner surface is angled relative to the longitudinal axis.

3. The pressure vessel of claim 1, further comprising a longitudinal axis, wherein the second portion of the sealing member includes a first surface angled relative to the longitudinal axis and a second surface angled relative to the longitudinal axis, wherein the first surface of the second portion contacts the first inner surface of the first flange, and wherein the second surface of the second portion contacts the second inner surface of the second flange.

4. The pressure vessel of claim 3 wherein the first inner surface is angled relative to the longitudinal axis, and wherein the second inner surface is angled relative to the longitudinal axis.

5. The pressure vessel of claim 1 wherein the second portion of the sealing member is secured in contact with the first inner surface of the first flange and the second inner surface of the second flange via an interference fit.

6. The pressure vessel of claim 1, wherein the sealing member has a T-shape.

7. The pressure vessel of claim 1, wherein the sealing member has an H-shape.

8. The pressure vessel of claim 1, wherein the sealing member has a ring-like shape that extends adjacent to the first inner surface and the second inner surface.

9. The pressure vessel of claim 1, further comprising a nuclear reactor core positioned adjacent to the first flange and/or the second flange.

10. The pressure vessel of claim 1, further comprising a clamp device positioned to clamp the first flange to the second flange.

* * * * *